April 2, 1946.　　　D. MacL. SMITH　　　2,397,815
INTERNAL-COMBUSTION TURBINE PLANT
Filed Jan. 13, 1944
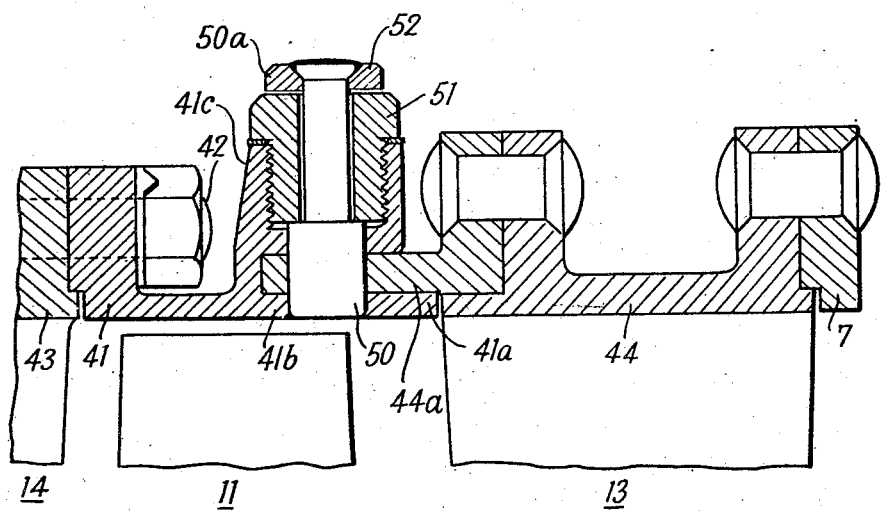
INVENTOR
David MacLeish Smith
BY Loyd Hall Sutton
ATTORNEY Patented Apr. 2, 1946

2,397,815

UNITED STATES PATENT OFFICE

2,397,815

INTERNAL-COMBUSTION TURBINE PLANT

David MacLeish Smith, Stretford, Manchester, England, assignor to Metropolitan-Vickers Electrical Company Limited, London, England, a company of Great Britain Application January 13, 1944, Serial No. 518,178
In Great Britain October 6, 1942

3 Claims. (Cl. 253—39)

This invention relates to internal combustion turbine plant and specifically concerns the fixing together of the foundation rings carrying the fixed blading and the coaxial casing rings. It will be appreciated that with such axially built-up construction assembly and dissembly is more difficult than is the case where the casing is "split" on a plane containing the axis of the machine, the latter method of construction being unsuitable, or even impermissible, in the case of internal combustion turbine plant which is used for the propulsion, for example, of light craft such as aircraft, where diameter and weight must be a minimum in relation to rigidity and strength and horsepower. Hence it is desirable to use the axially built-up ring structure as above specified and heretofore the several rings aforesaid have been united in axial alignment by bolts or set screws passing parallel with the axis through external flanges on the casing ring or rings and the foundation ring or rings of the fixed blading, but, owing to the cramped situation of the set screw heads and/or nuts, these are difficult of access during assembly, and the difficulty arises more particularly during dissembly for the withdrawal of the wheel or other rotor member, carrying more than one row of blades of the turbine or the like. In this connection reference may be conveniently made to the drawing of the copending application of Hayne Constant and Wilfred Merchant, Serial No. 518,180, filed January 13, 1944, where it will be seen that the foundation rings 43 and 44 of the fixed blading 14 and 13 respectively of the turbine are clamped between the externally flanged casing rings 7, 41 and 39 by means of the axial bolts such as 42, the heads and nuts of which are relatively inaccessible.

According to the present invention one of said ring members, conveniently the casing ring member, is connected to the next ring through axially overlapping portions by a series of at least two radial dowel-pins passing therethrough each such pin being freely rotatably secured in a bored spanner-headed screw, which can be screwed into and out of the outer of said overlapping portions, which is preferably in the casing ring, so as forcibly to cause the push-fit engagement and withdrawal of the dowel-pin without necessarily rotating the latter.

In carrying out the invention the dowel-pin is formed with an outer stem of smaller diameter than that of a dowel-pin proper, providing a shoulder, the outer portion passing through the bore in the nut-headed screw, whilst its outermost end has secured to it by riveting, welding or otherwise another member in the form of a washer.

The means according to the invention permits, as a subsidiary feature, the riveting together of the rings which are axially adjacent the rings which are united by said radial dowel-pins. Thus an outwardly flanged ring may have its flange, or one of its flanges, riveted to the flange of a foundation ring of the adjacent row of fixed blading such as 13 in the drawings of the aforesaid application, that is to say the foundation 44 may be provided with an external flange to which is riveted the flange of an auxiliary cylindrical member engaging in an annular recess in the adjacent casing ring through both of which the dowel-pins are engaged, the spanner-headed screws engaging in screw-threaded holes in a flange provided on said casing member.

The accompanying drawing is a fragmentary sectional elevation similar to certain parts of the figure of the earlier application aforesaid but including the modification according to the present invention: like reference numerals are applied where possible to similar parts, and attention should be had to said earlier application for a full understanding of the carrying out of the present invention.

Referring to the accompanying drawing, the foundation ring 43 of the fixed blading 14 is shown connected by one of several bolts or set screws 42 to the flange of the casing ring 41 which at its right-hand end 41a is of different form from that shown in the drawings of the aforesaid earlier application.

The foundation ring 44 of the fixed blading stage 13 is formed as shown with two peripheral flanges, one of which is shown riveted, as a matter of convenience, to the ring 7, whilst the left-hand flange of the foundation ring 44 is shown riveted to the flange of a cylinder 44a which overlaps with the right-hand end 41a of the casing ring 41. It is shown as fitting into an annular recess 41b in the end 41a of the casing ring, which is also provided with a flange or with bosses 41c radially drilled to a major diameter provided with a screw thread and to a minor diameter conveniently right through as shown. At 50 is shown the dowel pin proper which, as hereinbefore set forth, is provided with a stem portion 50a of smaller diameter freely fitting within the bore of a spanner-headed screw or plugs 51, whilst a washer 52 is riveted and welded to the radially outer end of the stem portion 50a.

I claim:

1. For or as part of an internal combustion turbine plant, an outer foundation ring of fixed blading, an adjacent ring, said rings having axially overlapping portions, means disconnectably securing said rings together comprising a radial dowel pin passing through said overlapping portions, and a bored spanner-headed screw engageable in the outer of said overlapping portions, said pin being freely rotatably secured in said screw.

2. Apparatus as claimed in claim 1, wherein said dowel pin is provided with a stem of reduced diameter passing freely through the bore of the spanner-headed screw, and means forming an enlarged head at the outer end of said stem for retaining the pin in the bore of the screw.

3. Apparatus as claimed in claim 1, said adjacent ring comprising a casing ring having an annular slot, and a flanged cylinder engaged in said slot to provide said overlapping portions, said foundation ring having a flange engaged with and secured to the flange of said cylinder.

DAVID MacLEISH SMITH.